United States Patent
Seo

(10) Patent No.: US 7,571,932 B2
(45) Date of Patent: Aug. 11, 2009

(54) EXPANDING-CONTROLLABLE AIRBAG SYSTEM

(75) Inventor: Bopil Seo, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/963,471

(22) Filed: Dec. 21, 2007

(65) Prior Publication Data
US 2009/0091108 A1   Apr. 9, 2009

(30) Foreign Application Priority Data
Oct. 4, 2007   (KR)   ........................ 10-2007-0099692

(51) Int. Cl.
*B60R 21/26* (2006.01)
(52) U.S. Cl. .................................................... 280/742
(58) Field of Classification Search .............. 280/730.1, 280/732, 736, 739, 740, 742
See application file for complete search history.

(56) References Cited
U.S. PATENT DOCUMENTS

| | | | |
|---|---|---|---|
| 5,513,877 A | 5/1996 | Mac Brien et al. | |
| 6,237,949 B1 * | 5/2001 | Nozumi et al. | 280/735 |
| 6,409,213 B2 * | 6/2002 | Webber et al. | 280/739 |
| 6,588,793 B2 * | 7/2003 | Rose | 280/728.2 |
| 6,631,920 B1 | 10/2003 | Webber et al. | |

\* cited by examiner

*Primary Examiner*—Faye M. Fleming
(74) *Attorney, Agent, or Firm*—Morgan, Lewis & Bockius LLP

(57) ABSTRACT

The present invention protects both upper part and lower part of the body of a passenger when an airbag expands in a collision and prevents secondary damage to a baby/infant by appropriately controlling expansion pressure of the cushion on the basis of characteristics of the their bodies. The present invention includes: a diffuser that is disposed in a crush pad and has gas supply holes, gas discharge holes, and an inflator; expansion pressure control member that is movably disposed with respect to diffuser and has at least an opening fluidly-communicating with gas supply holes and a closing portion opening or closing gas discharge holes; and a guide member connected with expansion pressure control member, guides cushion in a predetermined direction, and controls the opening or closing of gas discharge holes by moving expansion pressure control member with respect to diffuser using an internal or external force applied while cushion expands.

18 Claims, 5 Drawing Sheets

EXPANDING-CONTROLLABLE AIRBAG SYSTEM

CROSS-REFERENCE TO RELATED APPLICATIONS

The present application is based on, and claims priority from, Korean Application Serial Number 10-2007-0099692, filed on Oct. 4, 2007, the disclosure of which is hereby incorporated by reference herein in its entirety.

FIELD OF THE INVENTION

The present invention relates to an expanding-controllable airbag system, particularly an expanding-controllable airbag system that has an airbag that can be freely mounted at a desired position, and can prevent secondary damage to a baby/infant by controlling expansion pressure of the airbag that expands.

BACKGROUND OF THE INVENTION

Airbag systems used in vehicles in the related art have problems in terms of the mounting position and expandability of an airbag inside the vehicles. Accordingly, the airbag is divided into an airbag protecting the upper body of a passenger, such as head and chest, and an airbag protecting the lower body of a passenger, such as knees.

According to this configuration, each of the airbags should be provided with an inflator and a cushion individually. Therefore, it increases manufacturing cost and development costs and time for each of the airbags and tuning as well. Further, because the airbags are separately mounted at predetermined position, space loss is caused in a design package.

In particular, for a driver's seat where a SBW (Steer-By-Wire) technology is applied, because a cluster and a variety of design devices occupy spaces, it is difficult to mount airbags at the same position as a passenger's seat. Therefore, it was difficult to secure a sufficient space for the airbag.

Further, because airbags in the related art were not provided with a function that controls expansion of a cushion when the airbag expands, when a baby/infant is in a seat, the cushion caused serious secondary damage to their body.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

It is an object of the invention to protect both upper part and lower part of the body of a passenger by controlling expansion of a cushion when an airbag expands in a collision and prevent secondary damage to a baby/infant due to the expansion of the cushion by appropriately controlling expansion pressure of the cushion on the basis of characteristics of the their bodies.

Exemplary embodiments of the present invention provide an expanding-controllable airbag system including a diffuser, an expansion pressure control member, and a guide member. The diffuser is disposed in a crush pad and has at least a gas supply hole, at least a gas discharge hole, and an inflator. The expansion pressure control member is movably disposed with respect to the diffuser and has at least an opening fluidly-communicating with the gas supply holes and a closing portion opening or closing the gas discharge holes of the diffuser. The guide member is connected with the expansion pressure control member, guides a cushion in a predetermined direction, and controls the opening or closing of the gas discharge holes by moving the expansion pressure control member with respect to the diffuser using an internal or external force applied while the cushion expands.

According to an expanding-controllable airbag system of an exemplary embodiment of the invention, it is possible to effectively protect the whole body including the chest and the chest, in addition to the knees of a passenger by expanding the cushion of the airbag upward from the bottom inside a vehicle.

Further, because it is possible to effectively protect the whole body of a passenger using a single airbag system, it is possible to freely mount the airbag at desired positions and save time and economic cost for developing and tuning the airbag. In addition, it is possible to reduce space loss in design package because a space has to be secured to mount only an airbag in a vehicle.

Further, it is possible to prevent secondary damage to a baby/infant due to the expansion of the cushion by appropriately controlling expansion pressure of the cushion on the basis of characteristics of the their bodies.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
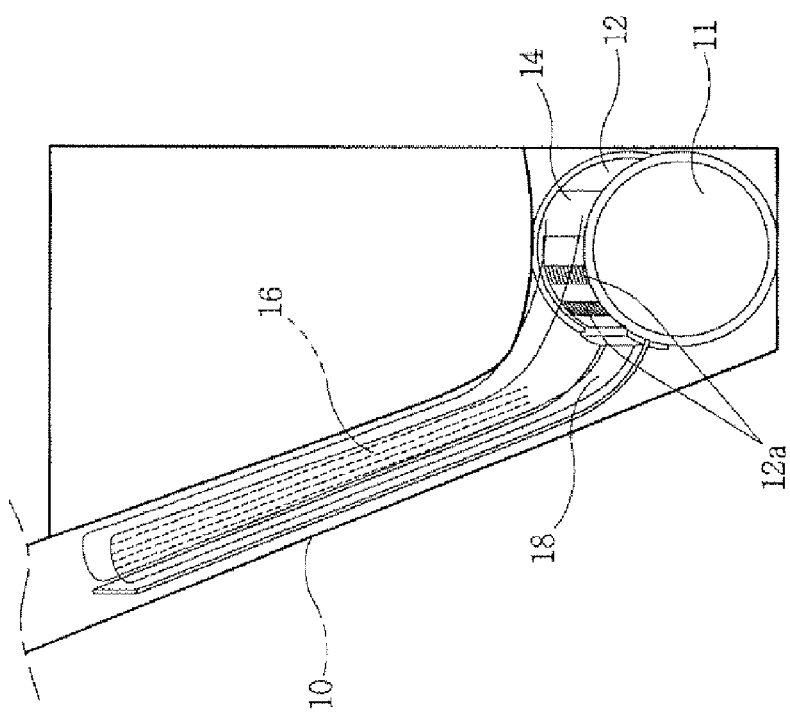
FIG. 1 is a view illustrating the configuration of an expanding-controllable airbag system according to an exemplary embodiment of the invention.
Figure 2:
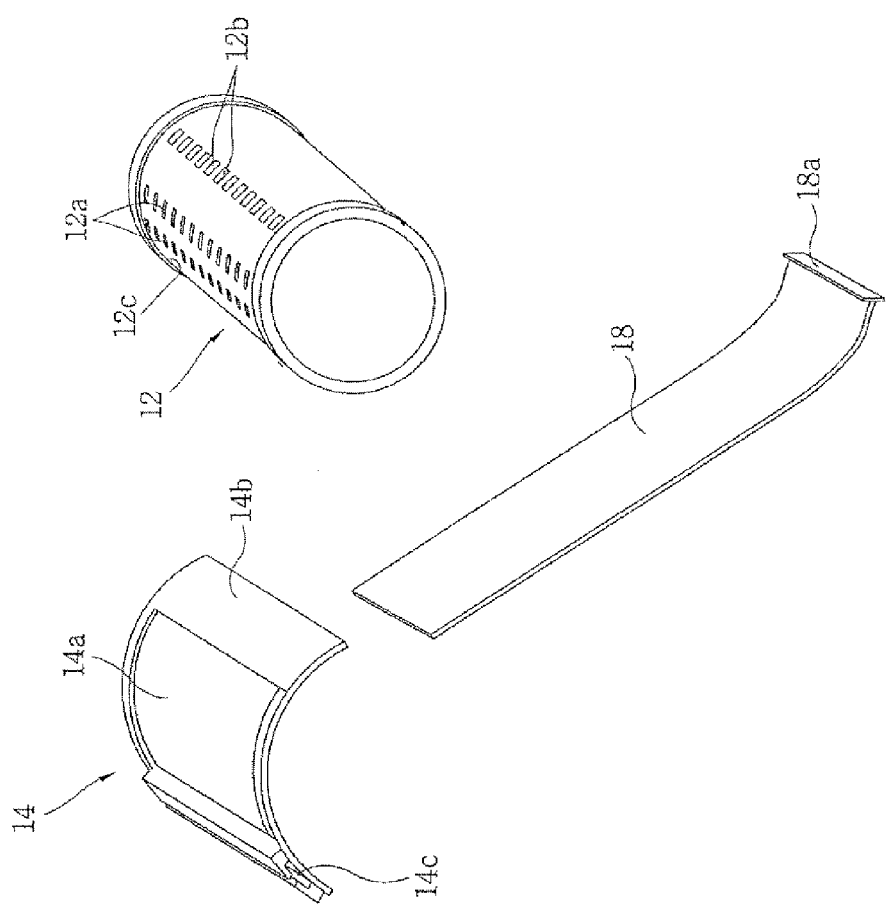
FIG. 2 is an exploded perspective view illustrating the detailed configuration of the expanding-controllable airbag system according to an exemplary embodiment of the invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

As shown in the figures, an expanding-controllable airbag system according to an exemplary embodiment of the invention includes a diffuser 12 disposed at the bottom portion inside a crush pad 10, an expansion pressure control member 14 controlling expansion pressure of a cushion 16 by a gas amount supplied through the diffuser 12, and a guide member 18 controlling operation of expansion pressure control member 14 by an internal or external force applied after cushion 16 has expanded.

The diffuser 12 is a cylinder having an inflator 11 inside and has at least a gas supply hole 12a for supplying a gas discharged from the inflator 11 into the cushion 16 and at least a gas discharge hole 12b for discharging the gas outside, not into cushion 16. Gas supply holes 12a and gas discharge holes 12b may be axially arranged in a plurality of rows around the circumference of diffuser 12.

Gas supply holes 12a contribute to expansion of cushion 16 and gas discharge holes 12b does not contribute to expansion of cushion 16. Further, a guide groove 12c is circumferentially formed at both distal end portions of diffuser 12.

Expansion pressure control member 14, an arc-shaped plate, is movably disposed with respect to diffuser 12 and has at least an opening 14a fluidly communicating with gas supply holes 12a and a closing portion 14b provided to control opening or closing the gas discharge holes 12b.

Further, the inlet portion of cushion 16 is hermetically connected to the entire edges of the opening 14a. Expansion pressure control member 14 is inserted in the guide grooves 12c circumferentially formed at both distal end portions of diffuser 12, such that the expansion pressure control member 14 is movably positioned with respect to diffuser 12 along the guide grooves 12c.

In addition, expansion pressure control member 14 has a mounting groove 14c to receive and support a proximate end portion of the guide member 18 as shown in FIG. 1. Mounting groove 14c extends in the transverse direction of expansion pressure control member 14 and the proximate end of guide member 18 is inserted in and engaged with the mounting groove 14c.

The proximate end portion of guide member 18 is connected to expansion pressure control member 14 and the guide member 18 guides the cushion 16 in a predetermined direction. Further, the guide member 18 controls opening or closing of the gas discharge holes 12b by controlling position of expansion pressure control member 14 with respect to diffuser 12 by an internal or external force while cushion 16 expands as explained later.

Further, a protrusion 18a is integrally formed at the proximate end portion of guide member 18 and is inserted in and engaged by the mounting groove 14c of expansion pressure control member 14.

On the other hand, the guide member 18 is disposed adjacent to the rear side of crush pad 10 and the cushion 16 is folded and received adjacent to the rear side of guide member 18 as shown in FIG. 1. To be more detailed, the cushion 16 is received such that it expands from lower portion to upper portion in crush pad 10 in expanding.

According to this configuration, since the inlet portion of cushion 16 is connected with the entire edges of the opening 14a of the expansion pressure control member 14 and the mid-portion of cushion 16 is connected with free distal end portion of guide member 18, cushion 16 expands to the upper portion while being guided along the rear side of guide member 18.

The operation of the expanding-controllable airbag system according to an exemplary embodiment of the invention is described in detail hereafter.

Inflator 11 positioned in the diffuser 12 is actuated to generate a gas in response to an airbag expansion signal in a collision, the gas flows into cushion 16 through gas supply holes 12a of the diffuser 12 and the opening 14a of expansion pressure control member 14, and then the cushion 16 is expanded upward by the gas that has flowed into cushion 16. Further, a portion of crush pad 10 where cushion 16 is received is opened outside while a tear line (not shown) is cut.

In an initial expanding of the airbig of the above successive processes, as shown in FIG. 1, because gas discharge holes 12b of diffuser 12 is maintained close by the closing portion 14b of expansion pressure control member 14, the gas generated from inflator 11 flows into the cushion 16 only through the gas supply holes 12a and the opening 14a of expansion pressure control member 14 and expands cushion 16 upward. That is, in an initial expanding of the airbag, cushion 16 expands to a knee-corresponding region of the lower body of a passenger.

Figure 3:
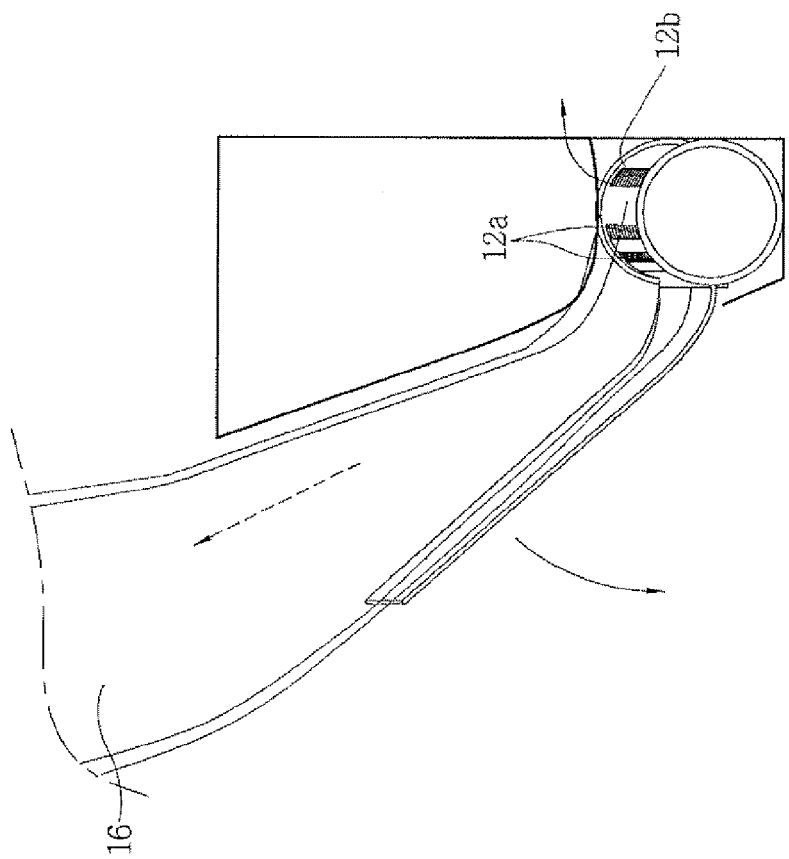
FIG. 3 is a view illustrating expansion under predetermined low pressure of the expanding-controllable airbag system according to an exemplary embodiment of the invention.

Subsequently, as the gas keeps flowing into cushion 16, as shown in FIG. 3, cushion 16 further expands, that is, cushion 16 expands up to a head/chest-corresponding region of the upper body of the passenger.

With this operation, the expansion pressure control member 14 is further rotated counterclockwise along the guide grooves 12c of diffuser 12 as the cushion 16 is expanded since the pressure of cushion 16, i.e., an inner force, expanded by the gas pushes the guide member 18 counterclockwise in the drawing.

Accordingly, the gas discharge holes 12b of diffuser 12 that are closed in the low pressure state by the closing portion 14b of expansion pressure control member 14 are opened, such that a portion of the gas generated from inflator 11 flows into cushion 16 through gas supply holes 12a and the other is discharged outside the cushion 16, not into the cushion 16, through gas discharge holes 12b.

As a result, cushion 16 is converted into a low-pressure expanding mode and maintains a low-pressure protection for the head/chest-corresponding region of the passenger.

Next, a state when an external force is applied to the crush pad 10 is explained.

Figure 4:
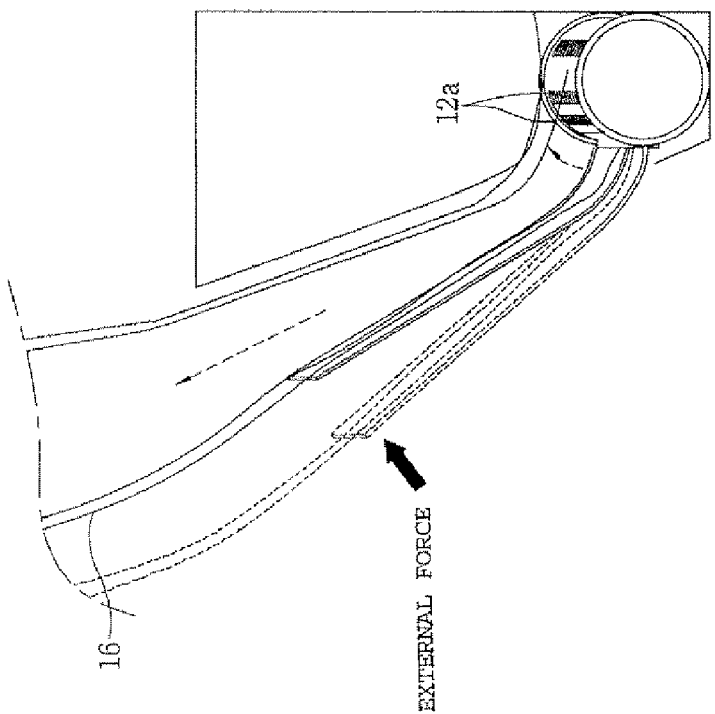
FIG. 4 is a view illustrating expansion under predetermined high pressure of the expanding-controllable airbag system according to an exemplary embodiment of the invention.

In an exemplary embodiment of the present invention, when an external force is applied to the crush pad 10 that is opened forward by the expanding cushion 16, that is, second impact in which the lower body of the passenger hits against crush pad 10 by the inertia force of the passenger after the collision is happened, as shown in FIG. 4, the expansion pressure control member 14 rotates clockwise along the guide groove 12c of the diffuser 12 in the drawing, such that the gas discharge holes 12b of diffuser 12 are closed by the closing portion 14b of expansion pressure control member 14.

Consequently, cushion 16 is converted again into a high-pressure expanding mode and maintains a high-pressure protection for the head/chest-corresponding region of the passenger.

Figure 5:
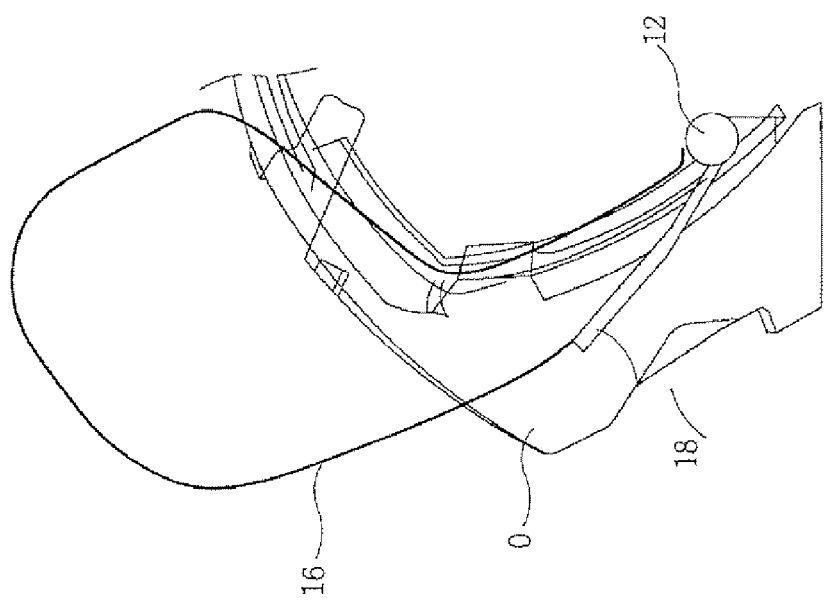
FIG. 5 is a view illustrating complete expansion of the expanding-controllable airbag system according to an exemplary embodiment of the invention.

In the above successive expanding processes, since the mid-portion of cushion 16 is connected to a free distal end portion of the guide member 18, the cushion 16 is guided in a predetermined direction while expanding, and particularly, expands from the lower portion to the upper portion in the vehicle as shown in FIG. 5. Therefore, it is possible to achieve protection through shock-absorbing by successively expanding from the lower body to the upper body of the passenger.

Further, when the passenger is a baby/infant, an external force is not applied to the guide member 18 in the low-pressure expanding of cushion 16, such that the gas discharge holes 12b of diffuser 12 is maintained open and cushion 16 keeps the lower-pressure expanding.

As a result, the baby/infant does not have a shock by secondary hitting against cushion 16 expanding under high pressure; therefore, it is possible to prevent damage to the baby/infant by the secondary hitting against the airbag expanding in a collision as in the related art.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. An expanding-controllable airbag system comprising:
 a diffuser having at least a gas supply hole, at least a gas discharge hole, and an inflator;
 an expansion pressure control member movably disposed with respect to the diffuser and having at least an opening fluidly-communicating the gas supply holes and a closing portion opening or closing the gas discharge holes; and
 a guide member connected with the expansion pressure control member, being installed outside of a cushion, guiding the cushion in a predetermined direction by contacting an outside surface of the cushion, and controlling the opening or closing of the gas discharge holes by moving the expansion pressure control member with respect to the diffuser using an external force or an internal force applied while the cushion expands.

2. The expanding-controllable airbag system of claim 1, wherein the external force is applied by an inertia force of a passenger after a collision of a vehicle occurs.

3. The expanding-controllable airbag system of claim 1, wherein the internal force is applied by the cushion as the cushion expands after a collision of a vehicle occurs.

4. The expanding-controllable airbag system as defined in claim 1, wherein the diffuser has a cylindrical shape, and the gas supply holes and gas discharge holes are axially arranged in a plurality of rows along the circumference of the diffuser.

5. The expanding-controllable airbag system as defined in claim 1, wherein guide grooves are formed at both distal end portions of the diffuser to receive and movably support both distal end portions of the expansion pressure control member.

6. The expanding-controllable airbag system as defined in claim 1, wherein the expansion pressure control member is an arc-shaped plate and has a mounting groove to receive a proximate end portion of the guide member.

7. The expanding-controllable airbag system as defined in claim 6, wherein a protrusion that is inserted in the mounting groove is formed at the proximate portion of the guide member.

8. The expanding-controllable airbag system as defined in claim 1, wherein an inlet portion of the cushion is connected to the entire edges of the opening of the expansion pressure control member and a mid-portion of the cushion is connected with a free distal end portion of the guide member.

9. The expanding-controllable airbag system as defined in claim 1, wherein the diffuser is disposed at a bottom in a crush pad and the guide member is disposed adjacent to a rear side of the crash pad.

10. An expanding-controllable airbag system comprising:
 a diffuser having at least a gas supply hole, at least a gas discharge hole, and an inflator;
 an expansion pressure control member movably disposed with respect to the diffuser and having at least an opening fluidly-communicating the gas supply holes and a closing portion opening and closing the gas discharge holes; and
 a guide member connected with the expansion pressure control member, being installed outside of a cushion, guiding the cushion in a predetermined direction by contacting an outside surface of the cushion, and controlling the opening and closing of the gas discharge holes by moving the expansion pressure control member with respect to the diffuser using an external force or an internal force applied while the cushion expands.

11. The expanding-controllable airbag system of claim 10, wherein the external force is applied by an inertia force of a passenger after a collision of a vehicle occurs.

12. The expanding-controllable airbag system of claim 10, wherein the internal force is applied by the cushion as the cushion expands after a collision of a vehicle occurs.

13. The expanding-controllable airbag system as defined in claim 10, wherein the diffuser has a cylindrical shape, and the gas supply holes and gas discharge holes are axially arranged in a plurality of rows along the circumference of the diffuser.

14. The expanding-controllable airbag system as defined in claim 10, wherein guide grooves are formed at both distal end portions of the diffuser to receive and movably support both distal end portions of the expansion pressure control member.

15. The expanding-controllable airbag system as defined in claim 10, wherein the expansion pressure control member is an arc-shaped plate and has a mounting groove to receive a proximate end portion of the guide member.

16. The expanding-controllable airbag system as defined in claim 15, wherein a protrusion that is inserted in the mounting groove is formed at the proximate portion of the guide member.

17. The expanding-controllable airbag system as defined in claim 10, wherein an inlet portion of the cushion is connected to the entire edges of the opening of the expansion pressure control member and a mid-portion of the cushion is connected with a free distal end portion of the guide member.

18. The expanding-controllable airbag system as defined in claim 10, wherein the diffuser is disposed at a bottom in a crush pad and the guide member is disposed adjacent to a rear side of the crush pad.

* * * * *